(12) United States Patent
Chung et al.

(10) Patent No.: US 7,412,990 B2
(45) Date of Patent: Aug. 19, 2008

(54) MICROFLUIDIC CONTROL DEVICE AND METHOD FOR CONTROLLING MICROFLUID

(75) Inventors: Kwang Hyo Chung, Daejeon-Shi (KR); Hae Sik Yang, Daejeon-Shi (KR); Dae Sik Lee, Daejeon-Shi (KR); Yong Taek Lim, Jeollabuk-Do (KR); Sung Jin Kim, Daejeon-Shi (KR); Se Ho Park, Daejeon-Shi (KR); Kyu Won Kim, Daejeon-shi (KR); Yun Tae Kim, Daejeon-Shi (KR)

(73) Assignee: Electronics and Telecommunications Research Institute, Daejeon-shi (KR)

( * ) Notice: Subject to any disclaimer, the term of this patent is extended or adjusted under 35 U.S.C. 154(b) by 345 days.

(21) Appl. No.: 10/898,964

(22) Filed: Jul. 27, 2004

(65) Prior Publication Data

US 2005/0133101 A1 Jun. 23, 2005

(30) Foreign Application Priority Data

Dec. 22, 2003 (KR) .................. 10-2003-0094752

(51) Int. Cl.
*F15C 1/06* (2006.01)
(52) U.S. Cl. .................. 137/833; 137/807; 422/103
(58) Field of Classification Search ......... 137/806–807, 137/833; 422/103; 436/52
See application file for complete search history.

(56) References Cited

U.S. PATENT DOCUMENTS

| 5,730,187 A | * | 3/1998 | Howitz et al. ............ 137/803 |
| 5,928,880 A | * | 7/1999 | Wilding et al. ............ 435/7.21 |
| 6,130,098 A | | 10/2000 | Handique et al. |
| 6,143,248 A | | 11/2000 | Kellogg et al. |
| 6,193,471 B1 | | 2/2001 | Paul |
| 6,271,040 B1 | | 8/2001 | Buechler |
| 6,296,020 B1 | | 10/2001 | McNeely et al. |
| 2002/0036018 A1 | * | 3/2002 | McNeely et al. ............ 137/806 |
| 2002/0064483 A1 | * | 5/2002 | Sando et al. ................. 422/100 |
| 2006/0102836 A1 | * | 5/2006 | Iida et al. ..................... 250/288 |

OTHER PUBLICATIONS

Wapner, Phillip G., et al.; "Utilization of surface tension and wettability in the design and operation of microsensors"; Sensors and Actuators B 71 (2000); pp. 60-67.
Fujii, Teruo, et al.; "A plug and play microfluidic device"; Lab Chip, 2003, 3; The Royal Society of Chemistry 2003; May 2003; pp. 193-197.

* cited by examiner

*Primary Examiner*—Stephen M. Hepperle
*Assistant Examiner*—Craig M Schneider
(74) *Attorney, Agent, or Firm*—Lowe Hauptman Ham & Berner LLP (57) ABSTRACT

Provided is a microfluidic control device and method for controlling the microfluid, and a fine amount of fluid is controlled even with natural fluid flow and solution injection, wherein a pressure barrier of a capillary is removed by a surface tension change resulted from the solution injection to thereby obtain transport, interflow, mixing, and time delay of the microfluid, and to detail this, solution is injected to meet the boundary surface of the stopped fluid when the fluid is stopped by the stop valve, so that a function of the stop valve is removed to obtain the transport, interflow, and mixing of the fluid, and the method for controlling the microfluid may be applied to the microfluidic control device for biochemical reaction, and it uses only the capillary force change resulted from solution injection to thereby have its structure simplified.

7 Claims, 13 Drawing Sheets

MICROFLUIDIC CONTROL DEVICE AND METHOD FOR CONTROLLING MICROFLUID

BACKGROUND

1. Field of the Invention

The present invention generally relates to a microfluidic control device and method for controlling the same, and more particularly, to a microfluidic control device and method for controlling the same, which allows a pressure barrier to be removed by means of a surface tension change resulted from solution drop, thereby enabling transport, confluence, mixing, and time delay of the microfluid.

2. Discussion of Related Art

In order to configure a bio chip, a bio sensor, a chemical sensor and so forth for a biochemical analysis, a complicated fluid network for microfluidic control such as transport, stop, mixing, reaction, exchange and confluence, a valve capable of operating in a chamber, a pump, and so forth are required. To that end, various driving methods are proposed, for example, mechanical pumping, thermopneumatic pumping, an electrostatic actuation, an electrophoretic method, electrochemical actuation, and a capillary flow method by means of surface tension.

The microfluidic control device using the above-mentioned principles are classified into an active microfluidic component and a passive microfluidic component, wherein the active microfluidic component controls fluid employing a micro pump or a valve driven by electrical and mechanical external forces, and the passive microfluidic component uses natural force and controls the fluid by means of surface modification of geometrical manipulation of the flow path or chamber.

The microfluidic control device using the capillary force is the passive type component, which enables various control of fluid by means of natural attractive or repulsive force resulted from surface tension between fluid and inner surface of the micro-channel. In general, it needs not a driving means, so that additional power supply is not required, which allows a instrument including a bio chip to be small size, and fabrication and operation costs to be reduced, and it is hardly out of order.

One example of applying the surface tension to a micro system is disclosed in a Paper of Sensors and Actuators B 71 (2000) entitled to "Utilization of surface tension and wettability in the design and operation of microsensors", wherein a pressure sensor, an accelerometer, a micro-pump, a micro-motor, fluid transport, fluid filling, inkjet, a robot probe, MicroOptoElectro Mechanical System (MOEMS) equipment, an optical shutter, a micro-switch, a micro stop valve, and so forth may be exemplified.

Examples of microfluidic control devices employing active control of fine droplet in the capillary are disclosed in U.S. Pat. No. 6,375,817 entitled "apparatus and methods for sample analysis" and U.S. Pat. No. 6,193,471 entitled "pneumatic control of formation and transport of small volume liquid samples", respectively.

Typical examples of the microfluidic control device employing the capillary flow are disclosed in U.S. Pat. No. 6,271,040 B1 (7 Aug., 2001) entitled "Diagnostic Devices Method and Apparatus for the Controlled Movement of Reagents without Membranes", U.S. Pat. No. 6,296,020 B1 (2 Oct., 2001) entitled "Fluid Circuit Components Based upon Passive Fluid Dynamics", and U.S. Pat. No. 6,143,248 (7 Nov., 2000) entitled "Capillary microvalve", and U.S. Pat. No. 6,130,098 (10 Oct., 2000) entitled "Moving microdroplets".

The U.S. Pat. No. 6,375,817 discloses an apparatus for transporting and separating a fine amount of fluid in a fast automated manner by using mechanically generated pressure difference, however, it requires an additional device for generating mechanical pressure difference.

The U.S. Pat. No. 6,193,471 discloses an apparatus for generating, transporting, mixing fine droplet, and removing an air bubble by means of pneumatic pressure control of a multichannel, however, it also requires a device for generating the pneumatic pressure.

The U.S. Pat. No. 6,271,040 B1 discloses a bio chip structure for diagnosis, which transports sample only using flow resulted from capillary force and increases transport time using pressure increase of the structure while the samples are subject to reaction in a chamber, and determines whether the samples react with an optical method, however, its structure is complicated, which causes it difficult to fabricate the structure and to control reaction time.

The U.S. Pat. No. 6,296,020 B1 discloses a structure, which allows fluid to be stopped using hydrophobic material or sudden expansion of flow path in the capillary.

The U.S. Pat. No. 6,143,248 discloses a microvalve for transporting a fine amount of fluid from a micro storage chamber to a transfer chamber by controlling capillary and centrifugal forces, however, it should disadvantageously apply the centrifugal force so as to perform reflow after the fluid is stopped.

The U.S. Pat. No. 6,130,098 discloses a microfluidic device for transporting a predetermined amount of small volume fluid by means of thermo-pneumatic pressure and stop valve with hydrophobic surface, however, it requires an additional structure for pumping and high power consumption.

As mentioned above, additional mechanical device or electrical device is used to control fluid in the related art, which cause its configuration to be complicated and fabrication cost to be increased. In addition, complicated flow path should be changed or its surface treatment should be performed when the fluid needs to be stopped or its speed needs to be reduced.

SUMMARY OF THE INVENTION

The present invention is directed to a microfluidic control device and method for controlling the microfluid by allowing a pressure barrier of the capillary to be removed by means of a surface tension change resulted from solution drop.

One aspect of the present invention is to provide a microfluidic control device, which comprises a storage chamber for storing fluid to be flown from outside; a branching flow channel connected to the storage chamber; at least one reaction chamber connected to the branching flow channel; connecting channel connected to the reaction chambers; a stop valve for stopping fluid from the connecting channel by means of capillary force; an confluence chamber where the fluid stopped at the stop valve is interflown; and a collection chamber connected to the confluence chamber, wherein boundary surface of the fluid stopped by the stop vale is removed after droplet is injected, so that the stop vale loses its function and the fluid continues to flow.

Another aspect of the present invention is to provide a method for controlling a microfluidic control device, which comprises the steps of providing fluid flown from outside to a reaction chamber; stopping the fluid provided from the reaction chamber by means of capillary force; removing a boundary surface of the fluid stopped at the stop valve by the injection of a droplet, leading to the loss of a function of the stop valve to allow the fluid to continuously flow.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF PREFERRED EMBODIMENTS

The present invention will now be described more fully hereinafter with reference to the accompanying drawings, in which preferred embodiments of the field emission device are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout the specification.

The present invention provides a microfluidic control device and method for controlling the microfluid, which implements various controls such as transport, interflow, time delay of fluid by injecting solution to change capillary force. Injecting solution in the present invention means a simple droplet dropping without using a device like a pump, and the capillary force may be adjusted by shape adjustment, surface reform and so forth. Solution dropping is mostly essential for biochemical reaction, so that an additional device is not used to drop the solution.

Figure 1A:
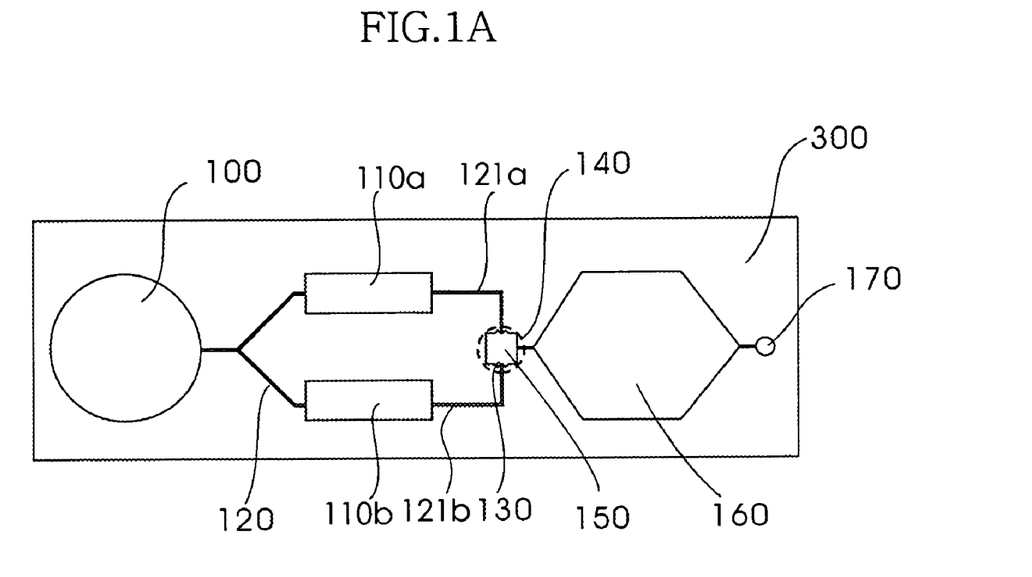
FIG. 1A and FIG. 1B are plane views for explaining a microfluidic control device in accordance with an embodiment of the present invention.
Figure 1B:
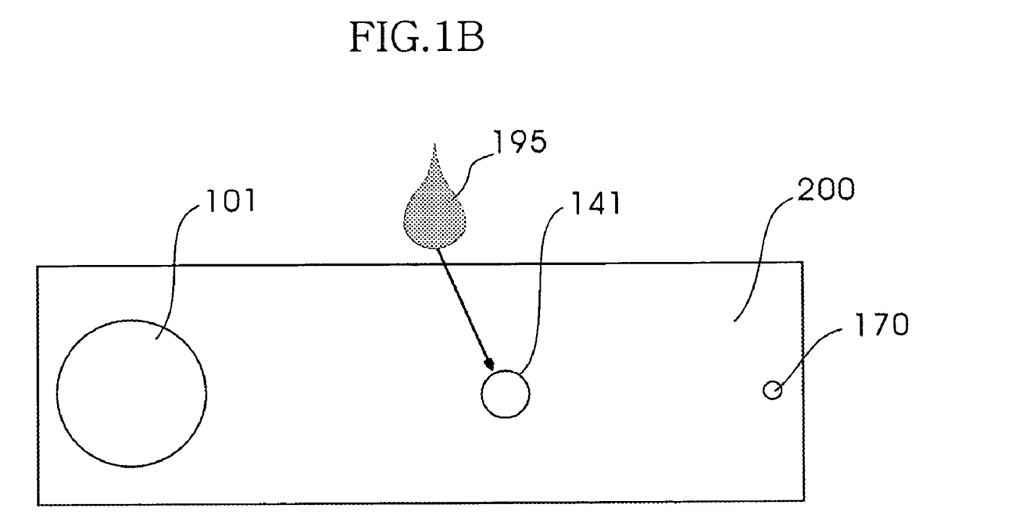

FIG. 1A and FIG. 1B are plane views for explaining a microfluidic control device in accordance with an embodiment of the present invention, wherein the microfluidic control device of the present invention is composed of an upper substrate 200 and a lower substrate 300, which are bonded to each other.

Referring to FIG. 1A, on the lower substrate 300 are formed an inlet storage chamber 100 for storing fluid injected from outside, a branching flow channel 120 connected to the storage chamber 100, reaction chambers 110a and 110b connected to the branching flow channel 120, connecting channels 121a and 121b connected to the reaction chambers 110a and 110b, a stop valve 130 for stopping the fluid provided from the connecting channel 121a and 121b by means of capillary force, a confluence chamber 150 where the fluid stopped at the stop valve 130 is interflown, a collection chamber 160 connected to the confluence chamber 150, an air hole 170 and so forth, and if necessary, a delay valve 180 for reducing flow speed of the fluid, and a storage chamber 190 for storing injected solution may be further formed.

Referring to FIG. 1B, on the upper substrate 200 are formed an opening 101 in a position to match the inlet storage chamber 100, an injection opening 141 for an injecting solution 195, an air hole 171 and so forth, and if necessary, a sense electrode for delivering an electrical signal to outside may be further formed.

The upper substrate 200 and the lower substrate 300 may be formed of various polymers including polymethylmethacrylate (PMMA), polycarbonate (PC), cycloolefin copolymer (COC), polydimethylsiloxane (PDMS), polyamide (PA), polyethylene (PE), polypropylene (PP), polyphenylene ether (PPE), polystyrene (PS), polyoxymethylene (POM), polyetheretherketone (PEEK), polytetrafluoroethylene (PTFE), polyvinylchloride (PVC), polyvinylidene fluoride (PVDF), polybutyleneterephthalate (PBT), fluorinated ethylenepropylene (FEP), perfluoralkoxyalkane (PFA), or single material or heterogeneous material of various metals including aluminum, copper, iron, in addition to silicon, glass, Printed Circuit Board (PCB) and so forth.

The lower substrate 300 may be fabricated by a hot embossing method, an injection molding method, a casting method, a stereolithography method, a laser ablation method, a rapid prototyping method, a silk screen method, in addition to a typical mechanical processing method such as a numerical control (NC) method, or a semiconductor processing method such as deposition or etching.

The upper substrate 200 and the lower substrate 300 may be bonded to each other by a typical adhesive or welding, ultrasonic bonding, and an adhesive based on its material.

Hereinafter, operation of the microfluidic control device having the above-mentioned configuration in accordance with the present invention will be described.

Referring to FIG. 1A, samples flown into the inlet storage chamber 100 are filled into the reaction chambers 110a and 110b through the branching flow channel 120. In this case, a driving force necessary for moving the fluid occurs from a natural capillary phenomenon so that it does not require an external driving force.

The fluid provided from the reaction chambers 110a and 110b continues to flow through the connecting channels 121a and 121b and stops in the stop valve 130. The stop valve 130 allows the fluid flow to be stopped during a time period necessary for fluid reaction to be occurred in the reaction chambers 110a and 11b. The stop valve 130 is a passive valve operated totally by the capillary force of the fluid, and does not require a driving force, and it is generally driven by drastic channel expansion. This will be described in detail with reference to equations below and accompanying drawings.

After the reaction time is passed, the solution 195 is injected into the confluence chamber 150 through the injection hole 140. In this case, the solution injection simply means an operation dropping a droplet. When the solution 195 is dropped, the stop valve 130 does not perform its own function of stopping the fluid due to removal of fluid boundary surface so that the fluid starts to flow again, which leads to have the fluid that has been reacted in the chambers 110a and 110h interflow the confluence chamber 150 while these two fluids are mixed at the same time. Thus, by means of solution 195 injection, a time delay for ensuring reaction time, a removal function of the stop valve 130, interflow and mixture of the fluid are implemented at the same time.

The fluid interflown in the confluence chamber 150 is moved to the collection chamber 160 by capillary force. In this case, airtight pressure does not occur by means of the air hole 170 formed at an end of exhaust chamber, so that the capillary force remains the same.

In the microfluidic control device having the above-mentioned configuration, all fluids are controlled by natural driving force obtained from the capillary force, and only solution injection is required to remove the function for the delaying time to ensure reaction time, and interflow and mixing the fluids of the stop valve 130.

The above-mentioned embodiment introduces the simplest form to explain the microfluidic control device of the present invention. Each component of the device may be variously modified and may include additional components. In particular, the delay valve 180, the stop valve 130, and the structure for solution injection will be described in the embodiment below.

FIG. 2A to FIG. 2D show a flow shape and a change of a droplet shape resulted from a relative size difference of surface tension between liquid and solid when the droplet is in contact with the surface of the solid or is applied to the capillary. In a microfluidic system having a very small size, a ratio of a surface area with respect to a volume is increased, so that force associated with the surface relatively plays a major role, and in particular, surface tension occurs when the boundary surface of the liquid is exposed to gas, a contact angle is obtained when it is in contact with the solid surface, and capillary flow occurs when it is applied to the capillary.

Figure 2A:
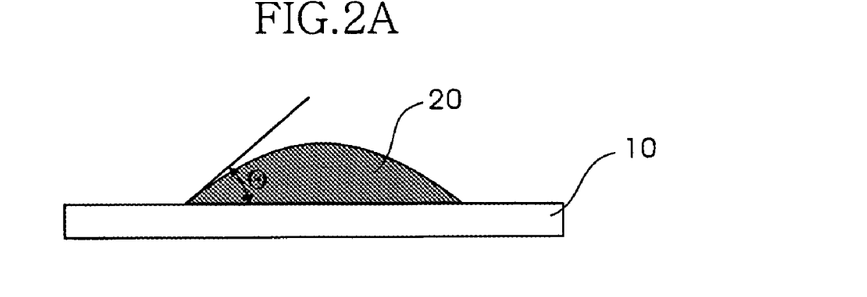
FIG. 2A to FIG. 2D are cross sectional views for explaining a flow shape and a change of a droplet shape on a solid surface and in a capillary.
Figure 2B:
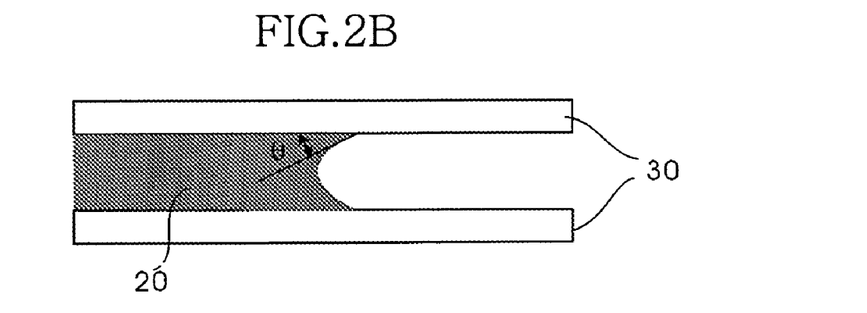
Figure 2C:
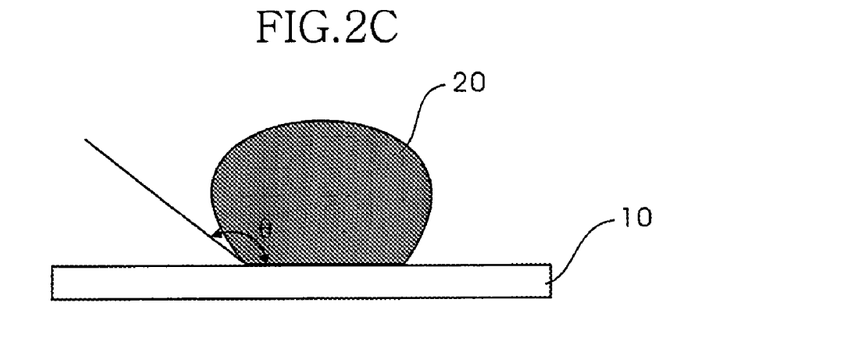
Figure 2D:
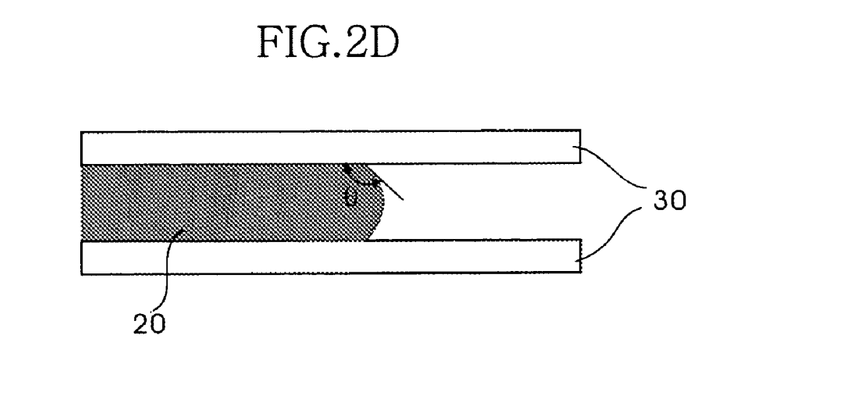

FIG. 2A is a shape where a liquid droplet 20 is placed on a flat plate 10 formed of a hydrophilic material, FIG. 2B is a leading edge shape of the liquid droplet 20 flowing through the hydrophilic capillary 30, FIG. 2C is a shape where a liquid droplet 20 is placed on a flat plate 10 formed of a hydrophobic material, and FIG. 2D is a leading edge shape of the liquid droplet 20 flowing through the hydrophobic capillary 30.

Referring to FIG. 2A and FIG. 2B, when the solid surface is hydrophilic and its contact angle θ is 90° or less, liquid wets the solid surface to allow the liquid to move in a right direction in the channel. Referring to FIG. 2C and FIG. 2D, when the solid surface is hydrophobic and its contact angle θ is 90° or more, the solid pushes the liquid to allow the liquid to move in a left direction in the channel. Capillary phenomenon is properly controlled to adjust a moving direction and a speed of the fluid in the present invention.

Figure 3A:
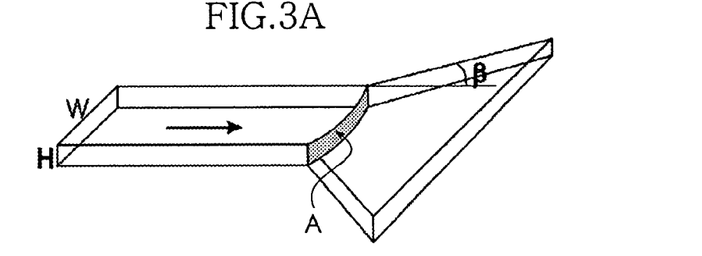
FIG. 3A is a conceptual view for explaining capillary force in an expanded channel.
Figure 3B:
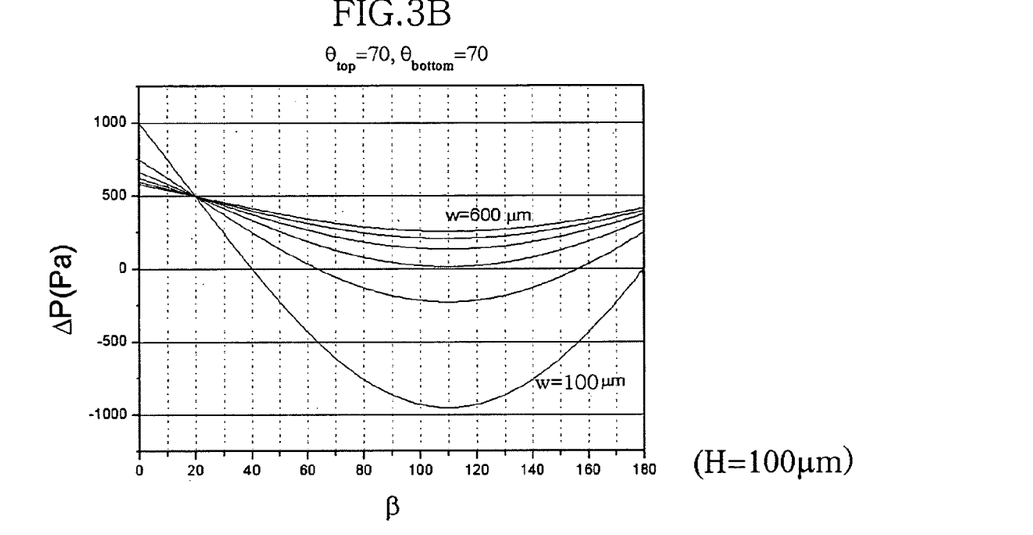
FIG. 3B and FIG. 3C are graphs for showing capillary force resulted from an expansion angle.
Figure 3C:
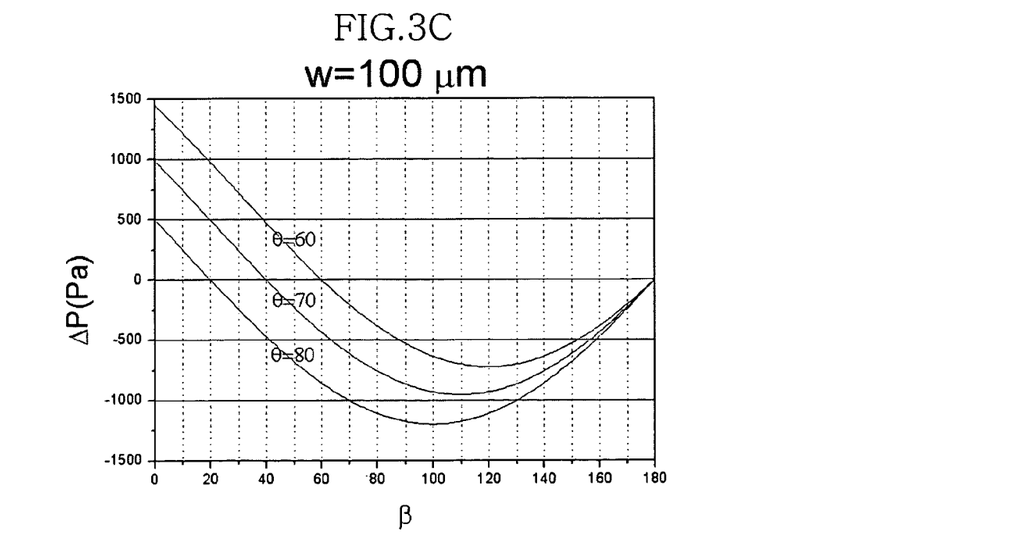

FIG. 3A is a conceptual view for explaining capillary power in an expanded channel, and FIG. 3B and FIG. 3C are graphs for showing capillary power resulted from an expansion angle.

FIG. 3A shows an expanded channel, wherein the fluid moves from the left direction to the right direction. Reference A indicates the fluid boundary surface at a point of starting the expansion. In this case, the capillary pressure at the expanded channel is as follows.

$$\Delta P = 2\sigma\left(\frac{\cos\theta}{H} + \frac{\cos(\theta + \beta)}{W}\right) \qquad \text{Equation 1}$$

wherein σ is a surface tension coefficient of the fluid, and θ is a contact angle.

When the value of ΔP is positive, the fluid does not stop but flows, and when it is negative, the fluid stops at the start point of expansion. In addition, when the upper substrate is formed of a heterogeneous material and the contact angle at one surface becomes different, the capillary force is as follows.

$$\Delta P = \sigma\left(\frac{\cos\theta_A + \cos\theta_B}{H} + \frac{2\cos(\theta_A + \beta)}{W}\right) \qquad \text{Equation 2}$$

Wherein A and B indicate a lower substrate and an upper substrate, respectively.

FIG. 3B and FIG. 3C are graphs for showing capillary power resulted from an expansion angle. A capillary force change is shown in response to changes of the expansion angle, contact angle, and channel width when the channel height is constant (e.g., 100 μm). The stop valve is designed to have the capillary force obtain a negative value, and the delay valve is designed to have the capillary force obtain a small positive value.

Figure 4:
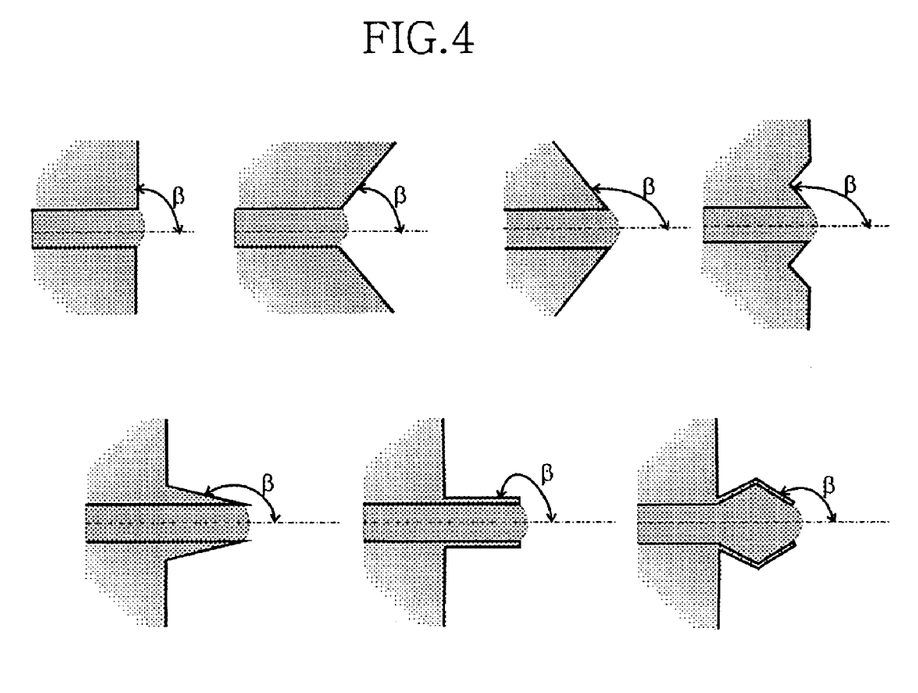
FIG. 4 shows various exemplary views of a stop valve using expansion of a planar channel width.

FIG. 4 shows various exemplary views of the stop valve using expansion of a planar channel width. The planar rapid expansion structure may be formed to have the channel width of the upper and lower substrates rapidly expanded so as to allow the expansion angle to be increased, or may be formed to have protrusion attached to. Expansion of the planar channel width facilitates processing because the channel height is constant.

Figure 5A:
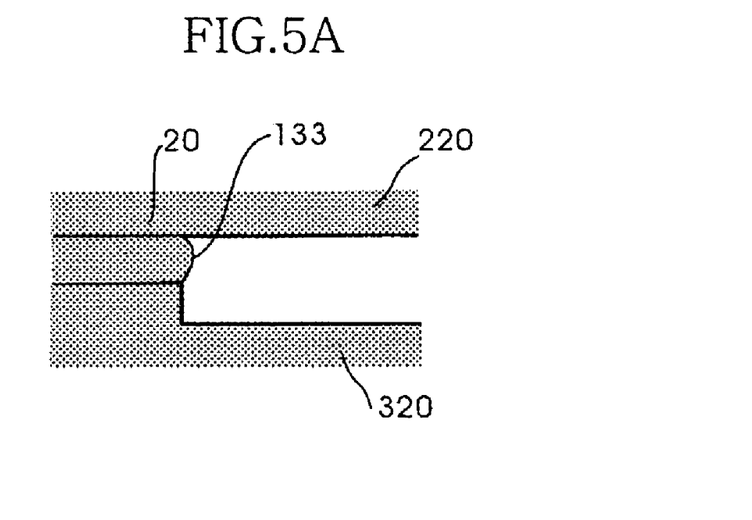
FIG. 5A and FIG. 5B are exemplary views of a stop valve using expansion of a cross sectional channel width.
Figure 5B:
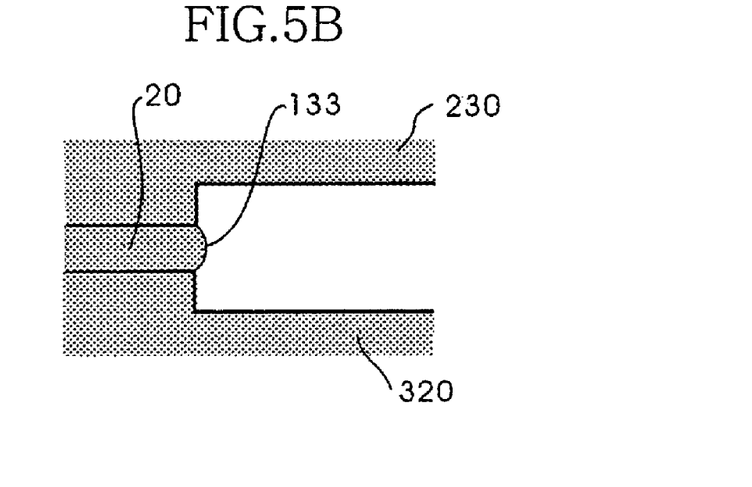

FIG. 5A and FIG. 5B are exemplary views of a stop valve using expansion of a cross sectional channel width. The cross sectional rapid expansion structure may be formed to have a channel height of the upper and lower substrates rapidly expanded so as to allow the expansion angle to be increased in a fluid transport direction.

Figure 5C:
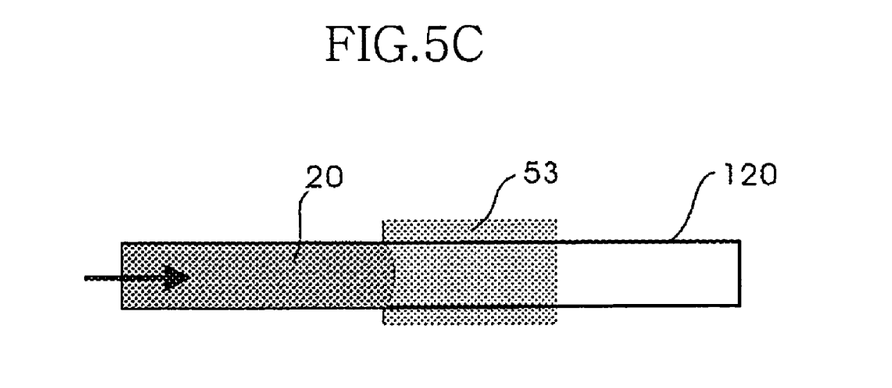
FIG. 5C is an exemplary view of a stop valve using a hydrophobic patch.

FIG. 5C is an exemplary view of a stop valve using a hydrophobic patch. The hydrophobic patch structure is formed by irradiating plasma or coating the hydrophobic material on channel wall surfaces of the upper and lower substrates.

The stop valve 133 may be implemented by forming the upper substrate 220 to be formed in a flat shape and the lower substrate 320 to be formed in a step shape, or it may be implemented by forming both of the upper and lower substrates 230 and 320 to have a step shape. The method for expanding the cross sectional channel width has a difficulty in performing processing and adjusting an expansion angle, and has a limit of an expansion width in response to a thickness of its material.

FIG. 5C is an exemplary view of a stop valve using a hydrophobic patch 53, the contact angle of the fluid 20 has a hydrophobic property because of the hydrophobic patch 53 formed on the channel wall surface, so that the fluid 20 does not flow any more in its transport direction. In this case, a process of obtaining temporal stability and forming the hydrophobic patch 53 is required.

Figure 6A:
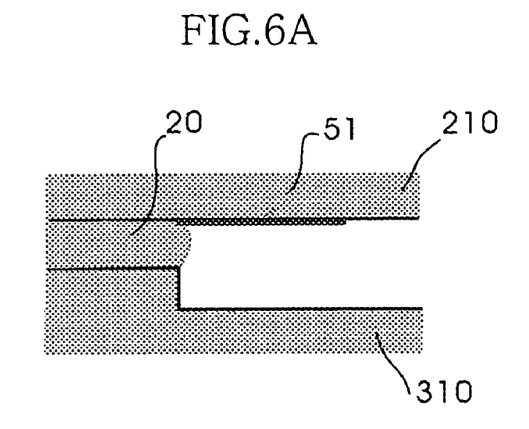
FIG. 6A to FIG. 6C are exemplary views of a stop valve using combinations of expansion of a planar channel width, expansion of a cross sectional channel width, and a hydrophobic patch.
Figure 6B:
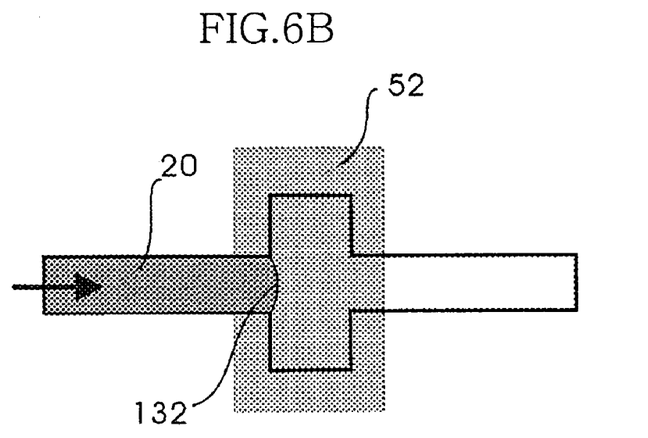
Figure 6C:
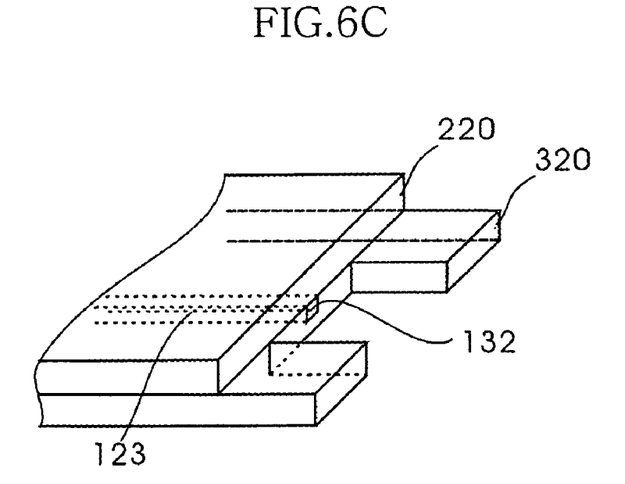

FIG. 6A to FIG. 6C are exemplary views of a stop valve using combinations of expansion of a planar channel width, expansion of a cross sectional channel width, and a hydrophobic patch.

Referring to FIG. 6A, it shows the structure of combining expansion of a cross sectional channel width and a hydrophobic patch 51, wherein the upper substrate 210 is shaped flat and the lower substrate 310 is shaped stepwise. The hydrophobic patch 51 is attached on a surface of the upper substrate 210.

Referring to FIG. 6B, it shows the structure in which expansion of the planar channel width and the hydrophobic patch 52 are combined.

Referring to FIG. 6C, it shows the structure in which expansions of the planar channel width and the cross sectional channel width are combined, wherein the stop valve 132 is formed between the upper substrate 220 and the lower substrate 320. Numerical reference 123 indicates the connecting channel.

The combination type stop valve as proposed in the present invention is an essential component for forming a stop valve that has a high stop pressure. By way example, when expansion pressure occurs due to heating and chemical reaction in the reaction chamber, there needs a stop valve having strong stop pressure. The various stop valves proposed in the present invention may be properly shaped in response to the contact angle determined by materials of the upper and lower substrates, and required stop pressure.

Figure 7:
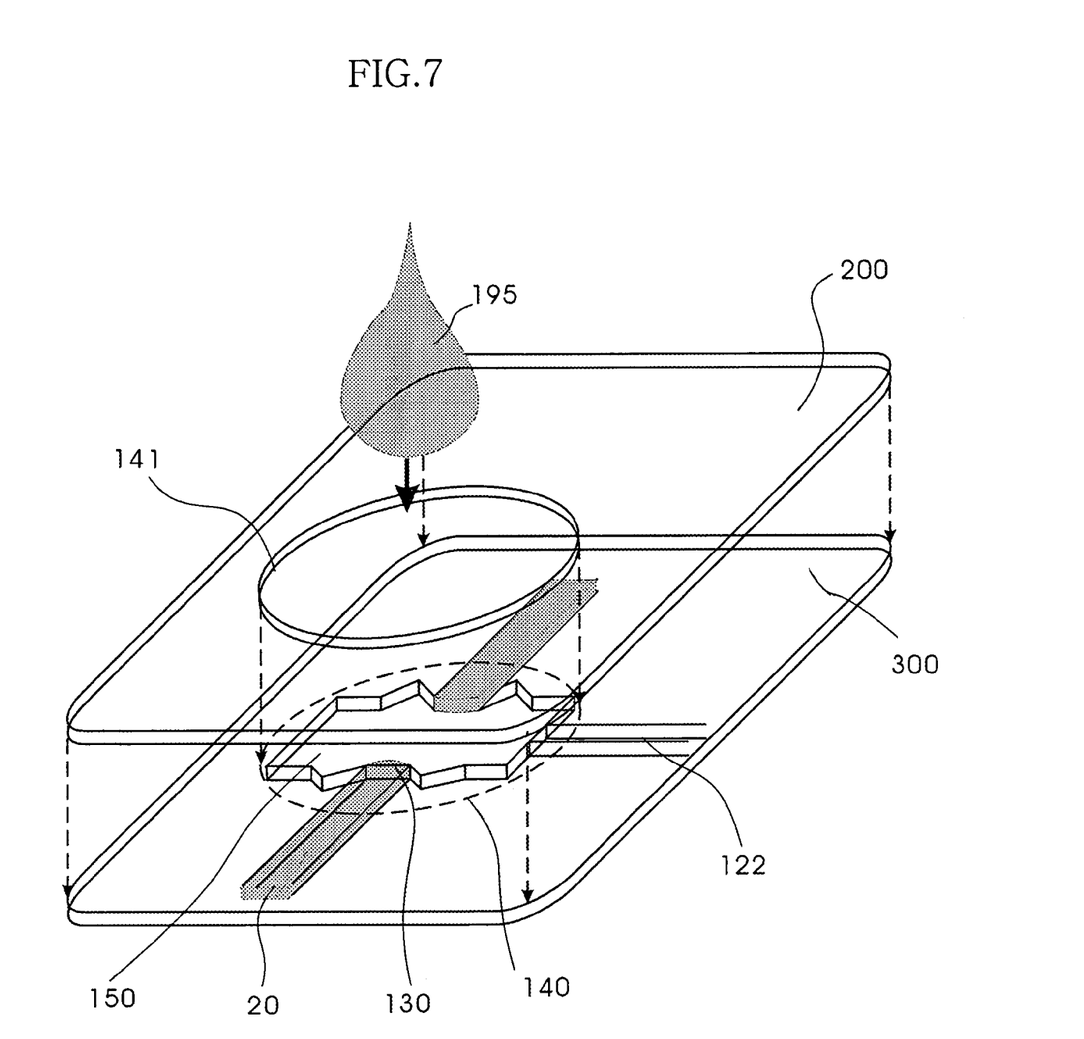
FIG. 7 is a structure view of a microfluidic control device configured to have a upper substrate and a lower substrate bonded to each other in accordance with an embodiment of the present invention.

FIG. 7 is a structure view of a microfluidic control device configured to have an upper substrate and a lower substrate bonded to each other in accordance with an embodiment of the present invention.

The microfluidic control device configured to use the stop valve 130 in the present invention is comprised of the upper substrate 200 where the injection hole 141 for the injecting solution 195 is formed, and the lower substrate 300 where the stop valve 130, the confluence chamber 150 and so forth are formed, and both substrates are bonded to each other. Since the stop valve 130 is connected to both sides of the confluence chamber 150, the fluid 20 flowing through the connecting channel 120 stops at the stop valve 130. When the droplet 195 is injected into the confluence chamber 150 through the injection hole 140 formed in the upper substrate 200, a function of the stop valve 130 is removed so that the fluid starts to flow through the laterally formed connecting channel 122.

FIG. 8A to FIG. 8G are exemplary views of a delay valve applied in the present invention, which show various shaped delay valves for delaying liquid flow on the flow path. As mentioned with reference to FIG. 3B and FIG. 3C, the capillary force should have a small positive value, and the channel width adjustment and surface reform may be applied so as to adjust the capillary force.

Figure 8A:
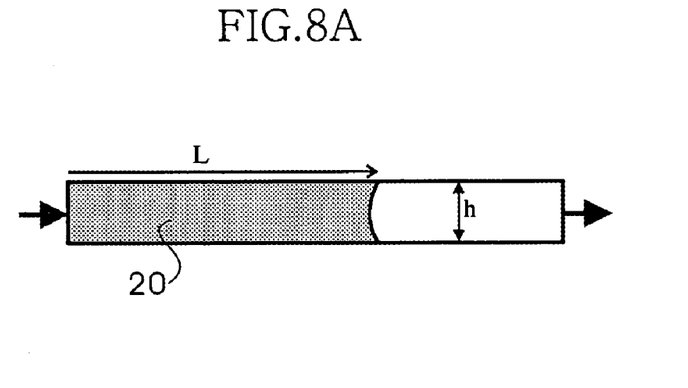
FIG. 8A to FIG. 8G are exemplary views of a delay valve applied in the present invention.

FIG. 8A shows a straight shaped channel, and the transport time of the fluid 20 may be expressed as the following equation.

$$L = \left(\frac{h\sigma\cos\theta}{3\mu}\right)^{1/2} \quad \text{Equation 3}$$

$$t = \frac{3\mu L^2}{h\sigma\cos\theta}$$

wherein, h indicates a channel height, σ indicates the surface tension, θ is a contact angle, and μ is a viscosity coefficient.

When the channel height h and surface tension σ are reduced and the viscosity coefficient μ is increased and the contact angle θ is close to 90°, it can be seen that the transport time τ is increased.

Figure 8B:
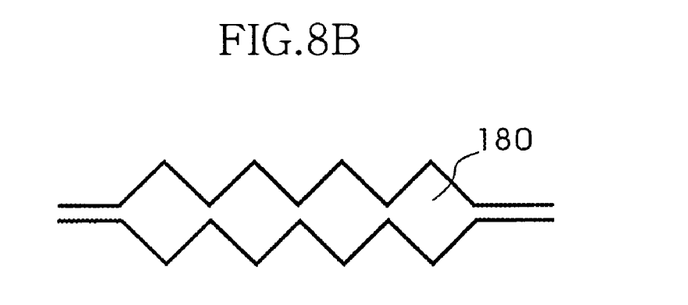
Figure 8C:
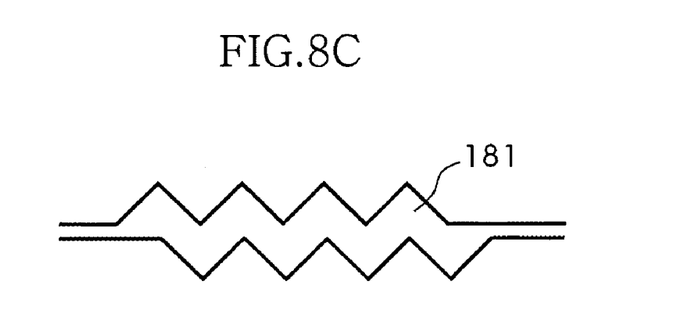

FIG. 8B and FIG. 8C are waveform shaped channels 180 and 181, wherein the transport time may be changed by properly adjusting the expansion angle as described with reference to FIG. 3B and FIG. 3C. FIG. 8B shows a structure where expansion and reduction are repeated, and FIG. 8C shows a structure using a cornering effect which continuously changes an expansion angle.

Figure 8D:
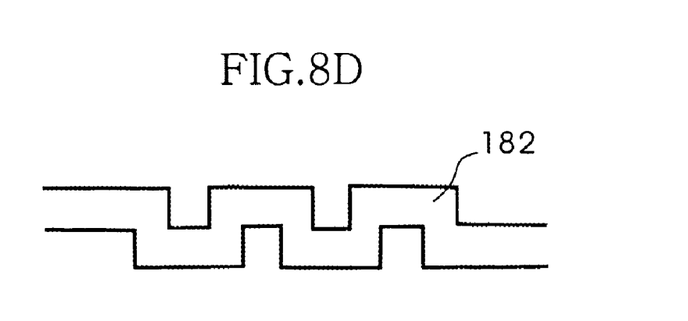
Figure 8E:
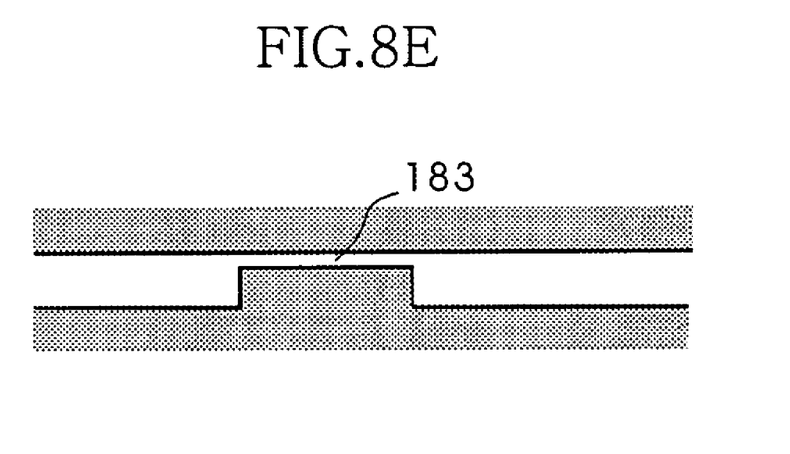
Figure 8F:
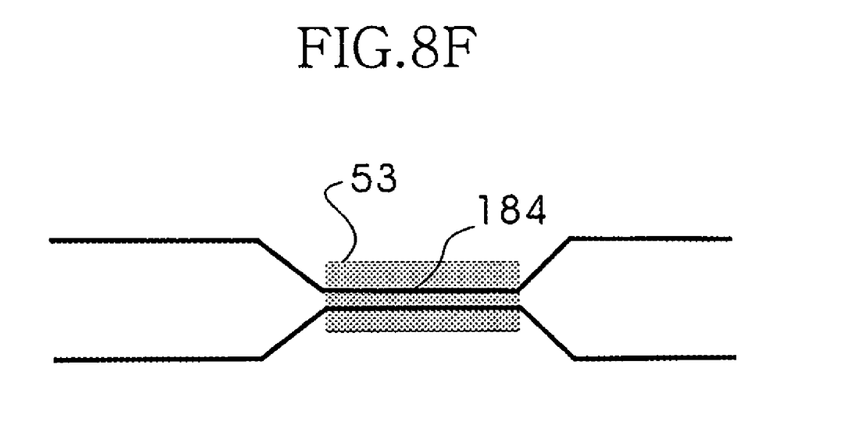
Figure 8G:
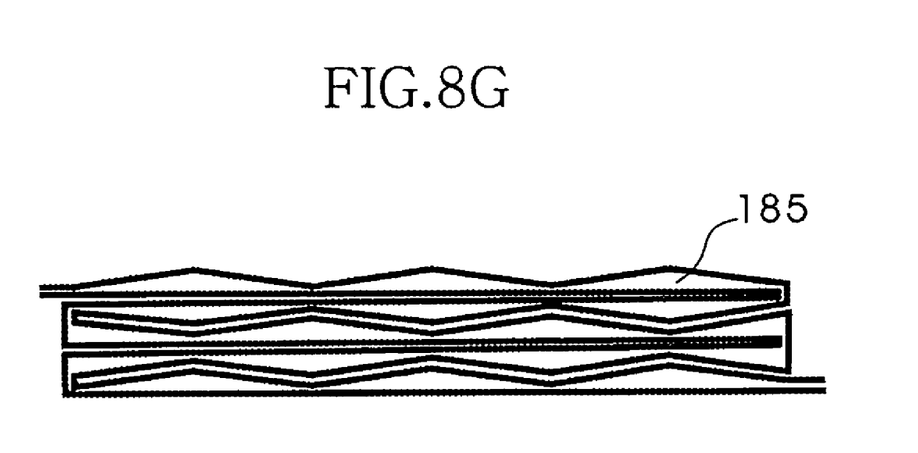

FIG. 8D shows a crooked channel 182 which properly uses the cornering effect. FIG. 8E indicates the time delay by drastically reducing the height of the channel 183. FIG. 8F shows a time delay structure for reducing the width of the channel 184 and using the hydrophobic patch 53. FIG. 8G shows a structure of the waveform type channel 185 in which reduction of flow path width and increase of flow path length are properly combined.

FIG. 9A to FIG. 9D are plane views for explaining various examples of microfluidic control device in accordance with the present invention.

Structures of FIG. 1A and FIG. 1B are used as its main structure in the present embodiment. In other words, a plurality of connecting channels 120 are connected to the inlet storage chamber 100 for storing the flown fluid, and a plurality of reaction chambers 110 are connected to the connecting channel 120, respectively. Each reaction chamber 121 is connected to the stop valve 130 and the confluence chamber 150 through the connecting channel 120. The confluence chamber 150 is connected to the collection chamber 160, and the air hole 170 is formed at an end of an exhaust chamber.

Figure 9A:
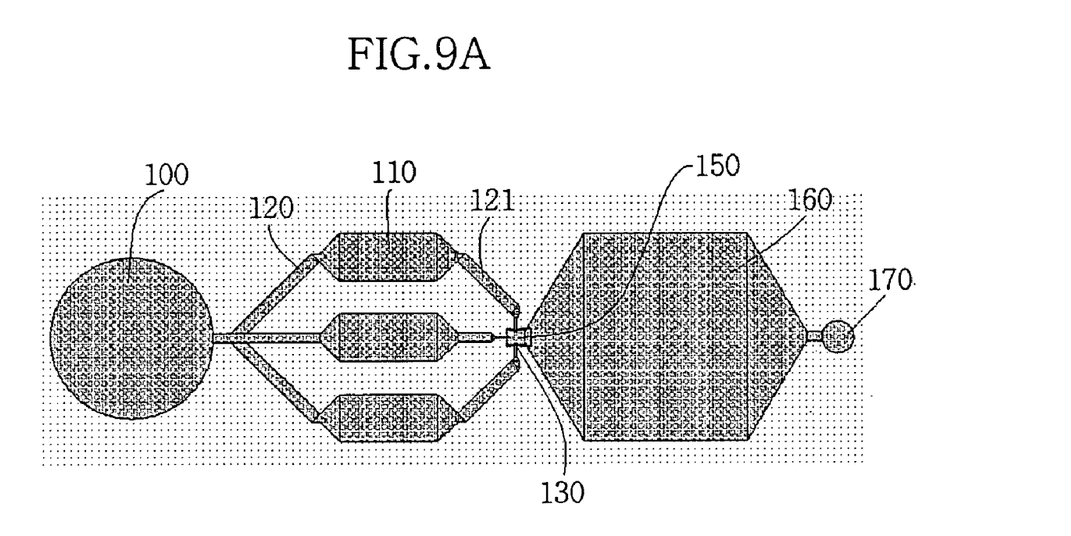
FIG. 9A to FIG. 9D are plane views for explaining various examples of a microfluidic control device in accordance with the present invention.

Referring to FIG. 9A, it shows a structure that can allow required numbers of reaction chambers 110 to be connected to and droplet to be directly injected to the confluence chamber 150.

Figure 9B:
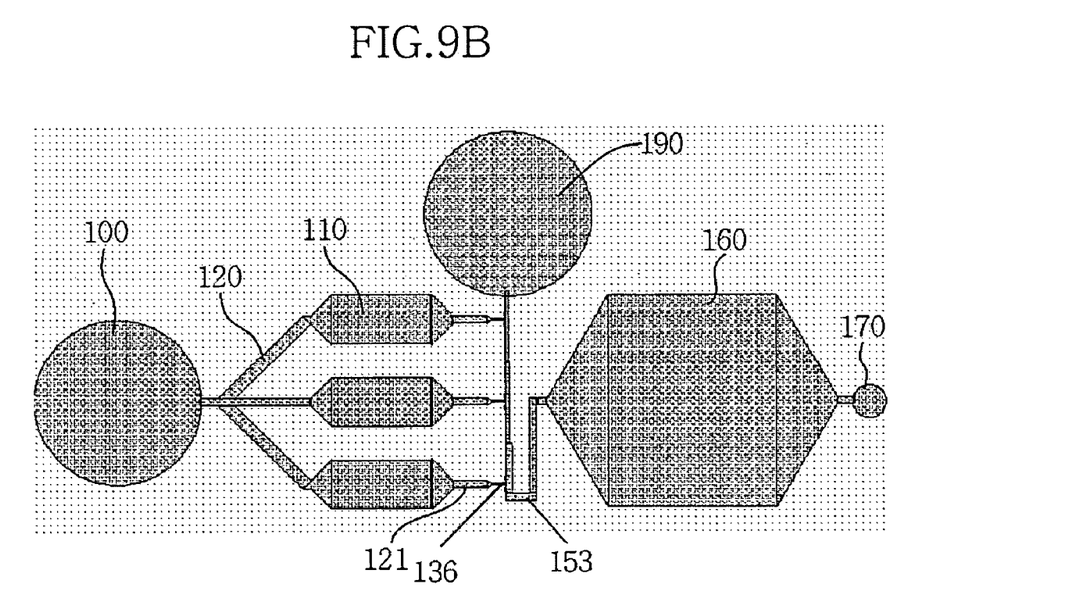

Referring to FIG. 9B, it shows a structure that connects the storage chamber 190 for storing injected solution to the stop valve 136, and injects the solution into the storage chamber 190. The stop valves 136 are sequentially removed in response to the flowing order of the injected solution, and the width of the confluence chamber 153 having the channel shape may be properly adjusted to determine the mixing ratio of the solution provided from each reaction chamber 110.

Figure 9C:
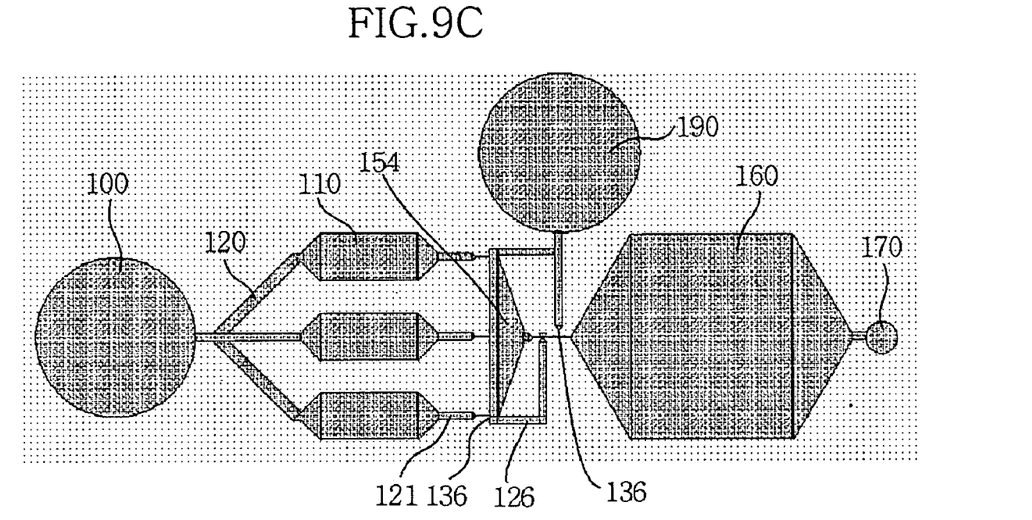

Referring to FIG. 9C, it shows a structure that has the confluence chamber 154 formed to be symmetrical in its upper and lower portions so as to apply uniform pressure when interflow and mixing are performed. The solution injected into the storage chamber 190 for storing the injected solution is flown through the connection path 126, and is automatically interflown and reflown through additional two stop valves 136 formed in its central portion.

Figure 9D:
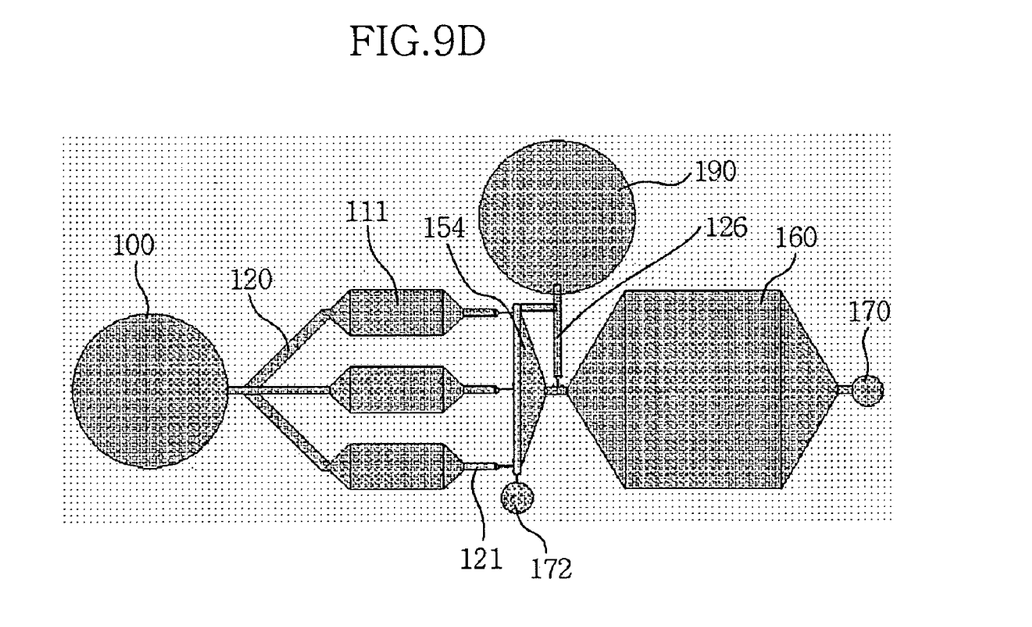

Referring to FIG. 9D, it is the modified structure of that shown in FIG. 9C, wherein the air hole 172 is additionally formed at a side of the confluence chamber 154.

FIG. 10A to FIG. 10E are configuration views for explaining various modified examples of a microfluidic control device in accordance with the present invention, which shows the modified structure of that in FIG. 1A and FIG. 1B, and this structure is complicated so that it is schematically shown to be indicative of each function instead of representing each detailed shape.

Figure 10A:
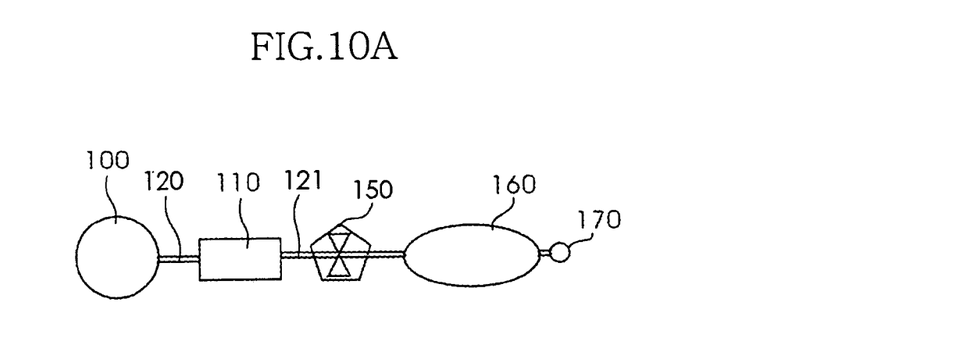
FIG. 10A to FIG. 10E are configuration views for explaining various modified examples of a microfluidic control device in accordance with the present invention.

Referring to FIG. 10A, this structure has a single reaction chamber 110, wherein a droplet is directly injected to the confluence chamber 150.

Figure 10B:
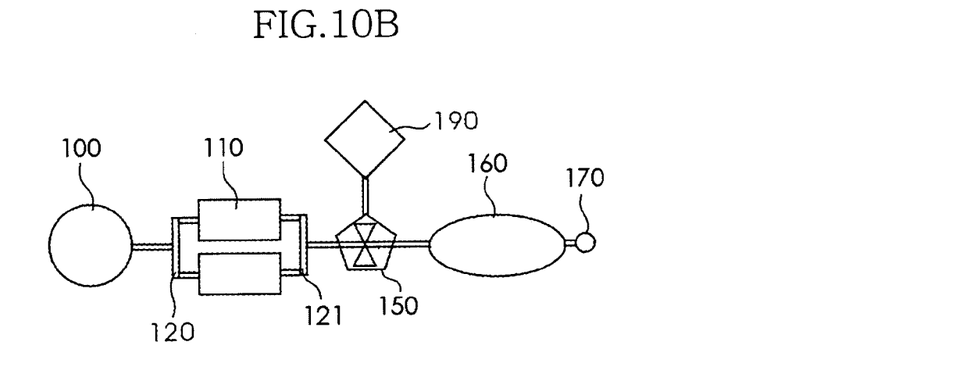

Referring to FIG. 10B, this structure has two reaction chambers 110 that may be connected to each other in parallel, and the storage chamber 190 for storing injected solution is additionally connected to the confluence chamber 150.

Figure 10C:
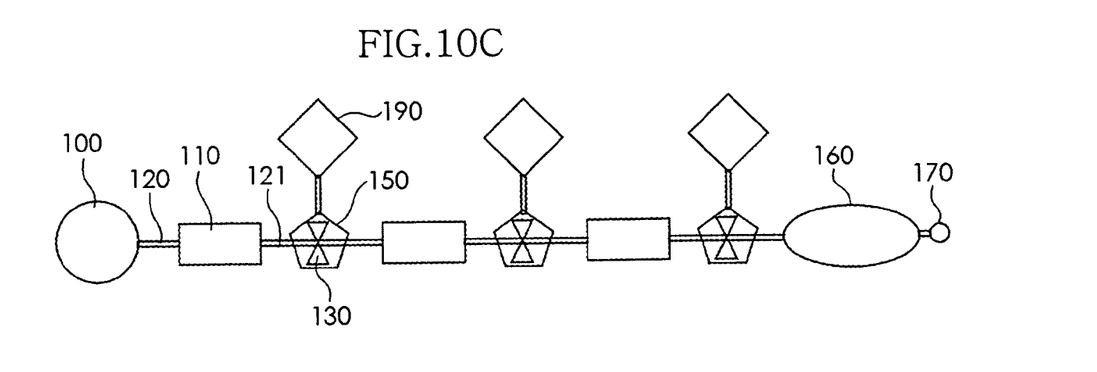

Referring to FIG. 10C, this structure shows that the reaction chamber 110, stop valve 130, confluence chamber 150, storage chamber 190 for storing the injected solution are repeatedly arranged. This structure may be applied to sequential reaction by injecting reaction materials different from one another to each of the storage chambers 190.

Figure 10D:
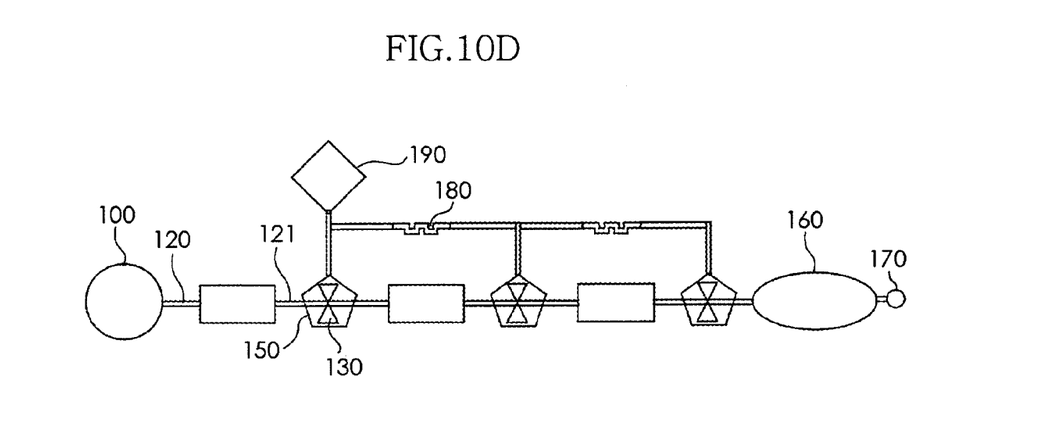

Referring to FIG. 10D, in this structure, the solution is injected to the storage chamber 190 for storing the injected solution one time to thereby have sequential reaction due to a natural delay caused by the delay valve 180. The reaction materials different from one another may be arranged to each reaction chamber 110 to automatically have sequential reaction.

Figure 10E:
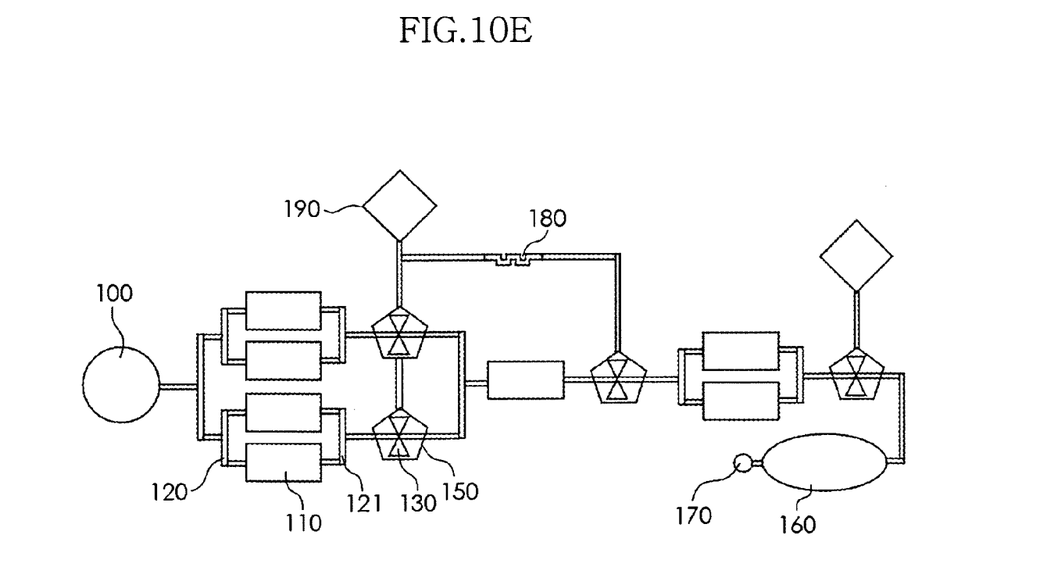

Referring to FIG. 10E, this structure may be applied to a case when more complicated sequential reaction or parallel biochemical reaction is required compared to the structure of FIG. 10D, wherein required numbers of reaction chambers 110 may be arranged and the solution may be injected in response to a desired delay time and a reaction order.

As mentioned above, the present invention does not employ complicated external control means such as mechanical pumping, electroosmosis, electrophoresis, heat, electrical signal and so forth, but employs natural fluid flow and solution injection by means of capillary force to control a fine amount of fluid. In other words, surface tension change resulted from the solution injection allows the pressure barrier of the capillary to be removed, so that the microfluid may be transported, interflown, mixed and delayed in time. The present invention does not require an additional device or power supply. Thus, it becomes possible to obtain a small sized portable device, and allows the fabrication cost to be reduced and the fabrication yield to be increased at the same time. In addition, the microfluidic control device of the present invention is easy to use and is hardly out of order.

The microfluidic control device of the present invention may be applied to various microfluidic control fields including a protein chip, a DNA chip, a drug delivery system, and a micro biological/chemical reactor, which requires fine and accurate fluid control.

While the present invention has been described with reference to a particular embodiment, it is understood that the disclosure has been made for purpose of illustrating the invention by way of examples and is not limited to limit the scope of the invention. And one skilled in the art can make amend and change the present invention without departing from the scope and spirit of the invention.

What is claimed is:

1. A microfluidic control device comprising:
   a storage chamber for storing fluid flowing from outside;
   a branching flow channel connected to the storage chamber;
   a plurality of reaction chambers connected to the branching flow channel;
   a connecting channel leading from each of the plurality of reaction chambers;
   a capillary stop valve configured to stop the fluid flowing from all of the connecting channels, the stop valve comprising a confluence chamber and an injection hole; and
   a collection chamber connected to the confluence chamber,
   wherein a motive force necessary for moving the fluid is derived from natural capillary phenomenon;
   wherein a boundary surface of the fluid from each of the connecting channels stopped at the stop valve is disturbed after a droplet is injected at the injection hole, causing the stop valve to lose its function of stopping the flow of fluid from the connecting channels, thereby allowing the fluid to flow through the confluence chamber to the collection chamber;
   wherein the stop valve is formed of a cross sectional rapid expansion structure so as to increase stop pressure of the stop valve; and
   wherein the cross sectional rapid expansion structure is shaped to have rapidly expanding channel heights of upper and lower substrates so as to increase an expansion angle in a transporting direction of the fluid.

2. The microfluidic control device as claimed in claim 1, further comprising:
   a storage chamber connected to the confluence chamber via the injection hole for injecting the droplet.

3. The microfluidic control device as claimed in claim 1, wherein the collection chamber has an air hole formed for maintaining the capillary force exerted on the fluid.

4. The microfluidic control device as claimed in claim 1, wherein the reaction chamber includes an electrode for at least one of reaction, sensing, and control.

5. The microfluidic control device as claimed in claim 1, further comprising:
   a delay valve connected to at least one connecting channel so as to delay the fluid flow.

6. The microfluidic control device as claimed in claim 5, wherein the delay valve has a straight line shape to have a low channel height and surface tension, and a high viscosity coefficient or contact angle.

7. The microfluidic control device as claimed in claim 5, wherein the delay valve is formed to be a waveform structure having a predetermined expansion angle.

* * * * *